(12) United States Patent
Lin

(10) Patent No.: US 7,594,571 B2
(45) Date of Patent: Sep. 29, 2009

(54) CONVEYING DEVICE FOR TESTING HEAT DISSIPATING FANS

(75) Inventor: Chun-Pin Lin, Taipei (TW)

(73) Assignee: Asia Vital Components Co., Ltd., Kaohsiung (TW)

( * ) Notice: Subject to any disclaimer, the term of this patent is extended or adjusted under 35 U.S.C. 154(b) by 820 days.

(21) Appl. No.: 11/326,364

(22) Filed: Jan. 6, 2006

(65) Prior Publication Data

US 2007/0159794 A1      Jul. 12, 2007

(51) Int. Cl.
  *B60L 1/00* (2006.01)
  *B60M 1/36* (2006.01)
(52) U.S. Cl. .................................. 198/339.1; 191/45 A
(58) Field of Classification Search ............. 198/339.1; 191/45 A, 45 R
  See application file for complete search history.

(56) References Cited

U.S. PATENT DOCUMENTS

| | | | | |
|---|---|---|---|---|
| 4,645,885 A | * | 2/1987 | Blesinger | 191/45 R |
| 5,449,056 A | * | 9/1995 | Ross | 191/6 |
| 5,503,259 A | * | 4/1996 | Clopton et al. | 191/6 |
| 6,202,809 B1 | * | 3/2001 | Paek | 191/45 A |
| 6,786,319 B2 | * | 9/2004 | Pan | 198/339.1 |
| 7,306,089 B2 | * | 12/2007 | Ellens | 198/465.3 |
| 7,373,718 B2 | * | 5/2008 | Lin | 29/743 |

\* cited by examiner

*Primary Examiner*—Mark A Deuble

(57) ABSTRACT

A conveying device for testing heat dissipating fans, which is suitable for testing multiple heat dissipating fans at the same time, includes a base, a conveying unit, a plurality of movable loading tables, which are placed on the conveying unit, and a first and second conductor rail units, which are disposed under the respective movable loading table. The conveying unit further includes a conveying element and an actuating element, which actuates the conveying element to move. Each movable loading table further includes a support plate, a test circuit on the support plate and a first and second conductive plates, which are disposed at the bottom of the support plate and spaced apart from each other. The first and second conductor rail units have a locating plate and a plurality of micro conductor rails, which are provided on the locating plates and space from each other. The first and second conductor rail units in company with the conveying unit to allow the heat dissipating fans on the movable loading tables being delivered along with being performed operation test.

7 Claims, 5 Drawing Sheets

CONVEYING DEVICE FOR TESTING HEAT DISSIPATING FANS

BACKGROUND OF THE INVENTION

1. Field of the Invention

The present invention is related to a conveying device and particularly to a conveying device for testing heat dissipating fans.

2. Brief Description of the Related Art

Usually, in order to secure heat dissipating fans being able to operate normally, most heat dissipating fans have to pass performance test precisely after being assembled, that is, each of the heat dissipating fans is charged with current to a state of power on for running a period of time to see if it normally runs.

The most popularly used method for testing the heat dissipating fans is that a batch of heat dissipating fans are powered on at the same time by the operator. Then, let the heat dissipating fans to run a period of time to see if the batch of heat dissipating fans runs normally. After that, another batch of heat dissipating fans are tested with the same way. This method is called batch type test.

However, the problem of the preceding method for testing the heat dissipating fans is that the operator has to power on all the heat dissipating fans in the batch at a very short time and it often to make the operator very nervously busy and messy. Afterward, there is no thing to be done by the operator during the running test. This results in waste of labor. Further, the operator has to check the imperfection of the heat dissipating fans with sight carefully. But, it is unavoidable that the operator is easy to miss the defective fan due to being careless.

Besides, another method for testing the heat dissipating fans is that delivery equipment is set up with conductor rails available on the market and the heat dissipating fans are loaded on the delivery equipment to be tested once power is supplied to the delivery equipment. The function of the conductor rails is capable of supplying power to the moving fans. However, the conductor rails used are for electric hoists and more space has to be occupied. Further, it is not easy to be moved to another position as desired so that this type of delivery equipment is not favorable for plant layout.

SUMMARY OF THE INVENTION

In order to solve the preceding problems, an object of the present invention is to provide a conveying device for testing heat dissipating fans with which the moving fans can be supplied power continuously for the operation test being implemented conveniently and a smaller space is sufficient for arranging the position needed by the conveying device flexibly.

Accordingly, the conveying device for testing heat dissipating fans according to the present invention, which is suitable for testing multiple heat dissipating fans at the same time, includes a base, a conveying unit, a plurality of movable loading tables, which are placed on the conveying unit, and a first and second conductor rail units, which are disposed under the respective movable loading table.

The conveying unit further includes a conveying element and an actuating element, which actuates the conveying element to move. Each movable loading table further includes a support plate, a test circuit on the support plate and a first and second conductive plates, which are disposed at the bottom of the support plate and spaced apart from each other. The first and second conductor rail units have a locating plate, which is fixedly attached to the base, and a plurality of micro conductor rails, which are provided on the locating plates and space from each other. Each micro conductor rail is electrically connected to each other and further includes a first main member and a first conductive spring plate, which is resiliently mounted to the first main member and is capable of contacting the first conductive plate. Each second micro conductor rail further includes a second main member and a second conductive spring plate, which is resiliently mounted to the second main member and is capable of contacting the second conductive plate.

When the first and second conductor units are charged with positive and negative current respectively, the positive and negative current are capable of being sent to the test circuit such that each of the heat dissipating fans on the movable loading tables is able to electrically connect with the test circuit for carrying out performance test during moving with the conveying device.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
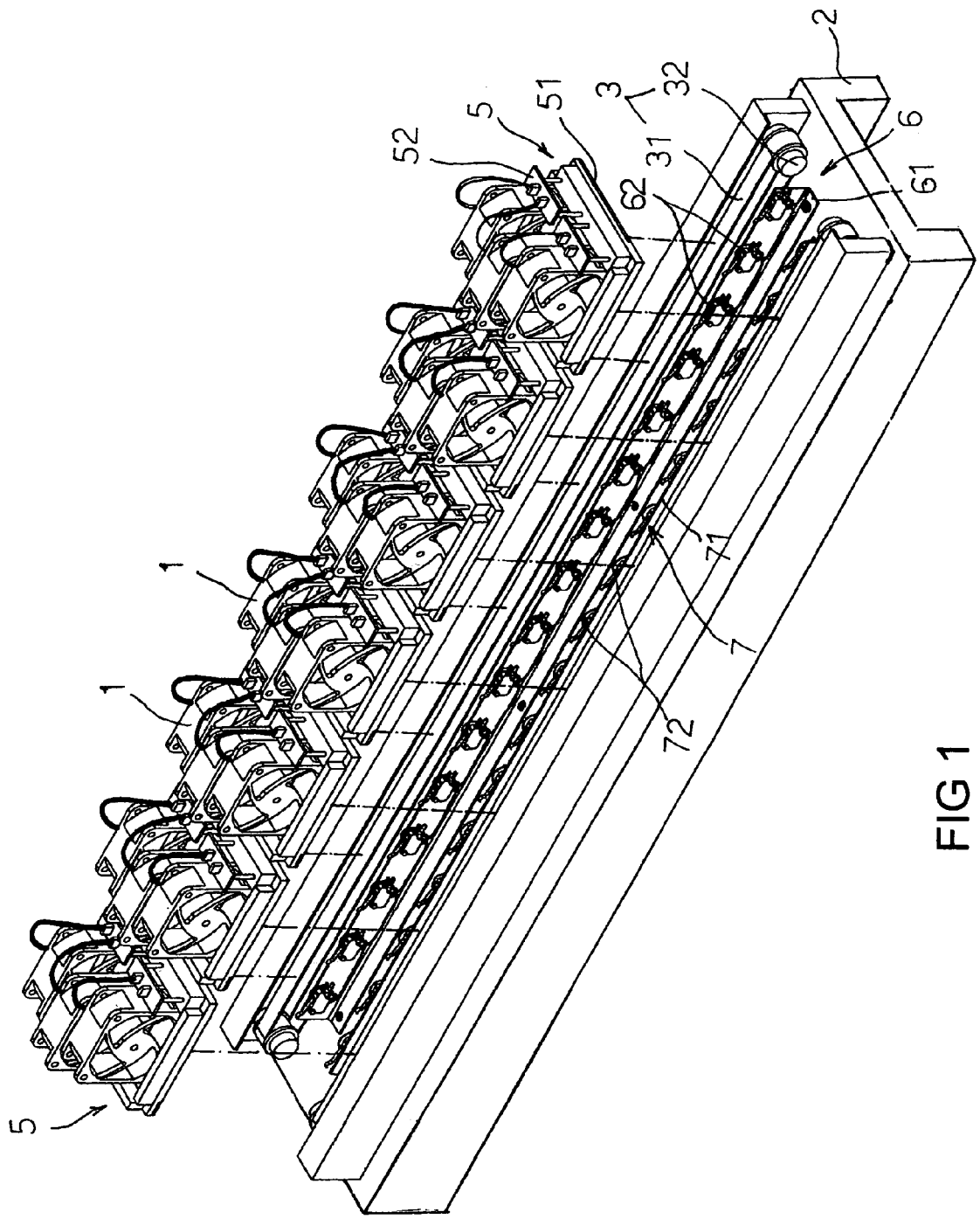
FIG. 1 is a perspective view of the first embodiment of a conveying device for testing heat dissipating fans according to the present invention.

Referring to FIG. 1, the first embodiment of a conveying device for heat dissipating fans according to the present invention is suitable for testing multiple heat dissipating fans at the same time. The conveying device of the present invention includes a base 2, a conveying unit 3, a plurality of movable loading tables 5, a first conductor rail unit 6 and a second conductor rail unit 7. The base 2 provides wheels (not shown) available for adjusting the position of the conveying device.

The conveying unit 3 is provided on the base 2 and includes a conveying element 31 and an actuating element 32 for moving the conveying element 31. The conveying element 31 is composed of two conveying belts spacing apart from each other. The actuating element 32 is a motor and the motor is conventional art so that no detail will be described further.

Figure 2:
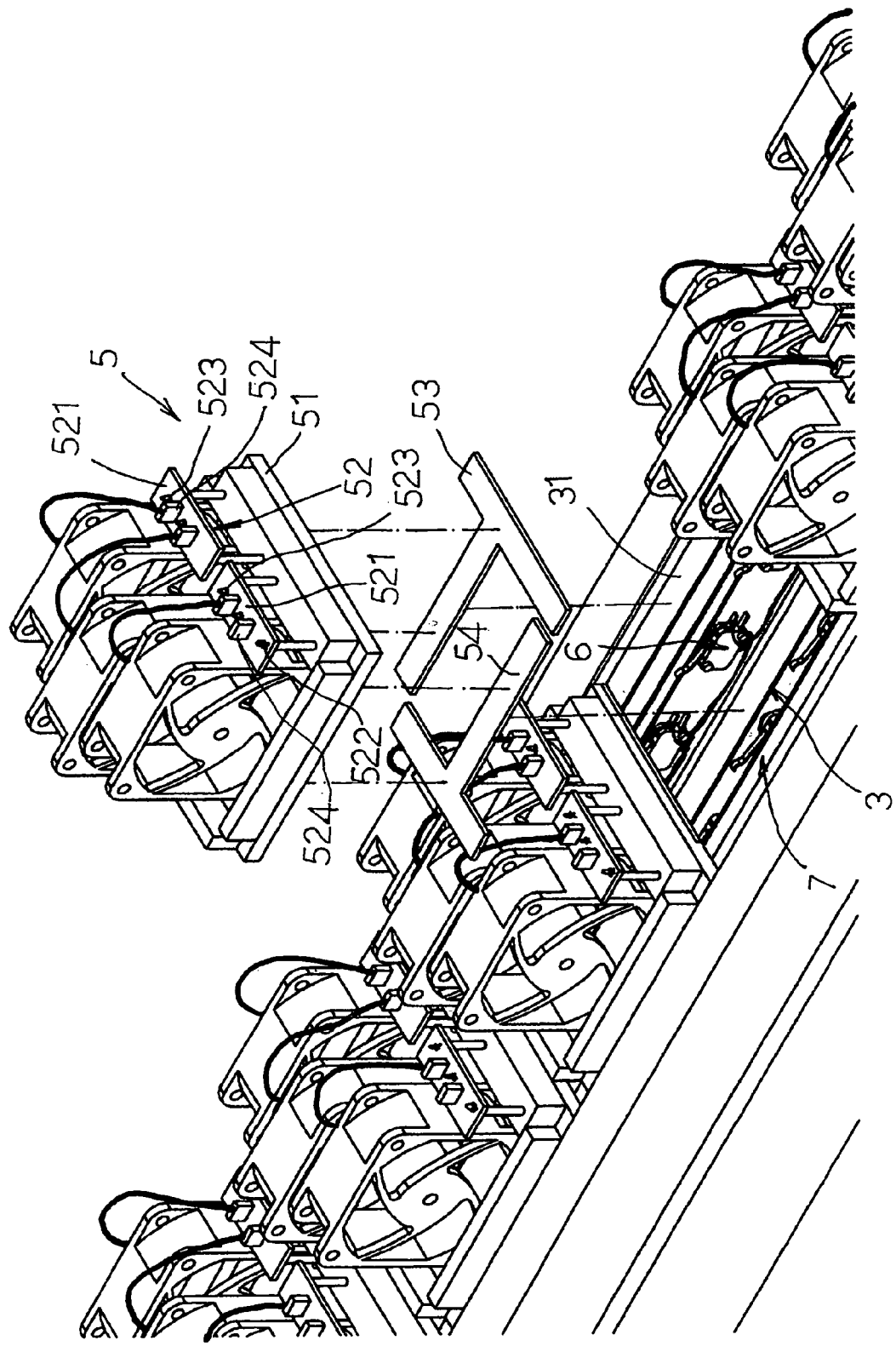
FIG. 2 is an exploded perspective view illustrating a movable loading table providing a first and a second conductive plates electrically contacting with a first and a second conductor rail units.

Referring to FIG. 2, the movable loading tables 5 are disposed on the conveying element 31 to move with the conveying element 31. Each of the movable loading tables 5 includes a support plate 51, a test circuit 52 on the support plate 51 and a first and second conductive plates 53, which are disposed at the bottom of the support plate 51 and spaced apart from each other. The test circuit 52 is divided by two circuit boards 521 in order to facilitate fabrication in the present embodiment. Alternatively, the test circuit can be arranged with an integral piece of circuit board. The test circuit 52 on each movable loading table 5 has a power indication light 522, four operation lights 523, which are disposed on the two circuit boards 521, and an outlet 524, which is electrically connected to the operation lights 523. The power indication light 522 is used for signaling if the power is normally supplied and the operation indication lights 523, which are electrically connected to the heat dissipating fan, are used for signaling if the heat dissipating fan 1 runs smoothly.

Each of the movable loading tables 5 in the first embodiment are electrically connected to three tested heat dissipating fans 1 and, at most, the respective movable loading tables 5 can be electrically connected to four tested heat dissipating fans 1. In practice, it is acceptable that only one tested heat dissipating fan 1 is electrically connected to one of the movable loading tables 5. The number of tested heat dissipating fans 1 is variable based on the size of each of the heat dissipating fans 1. Of course, more operation lights 523 and corresponding outlets 524 can be provided.

Figure 3:
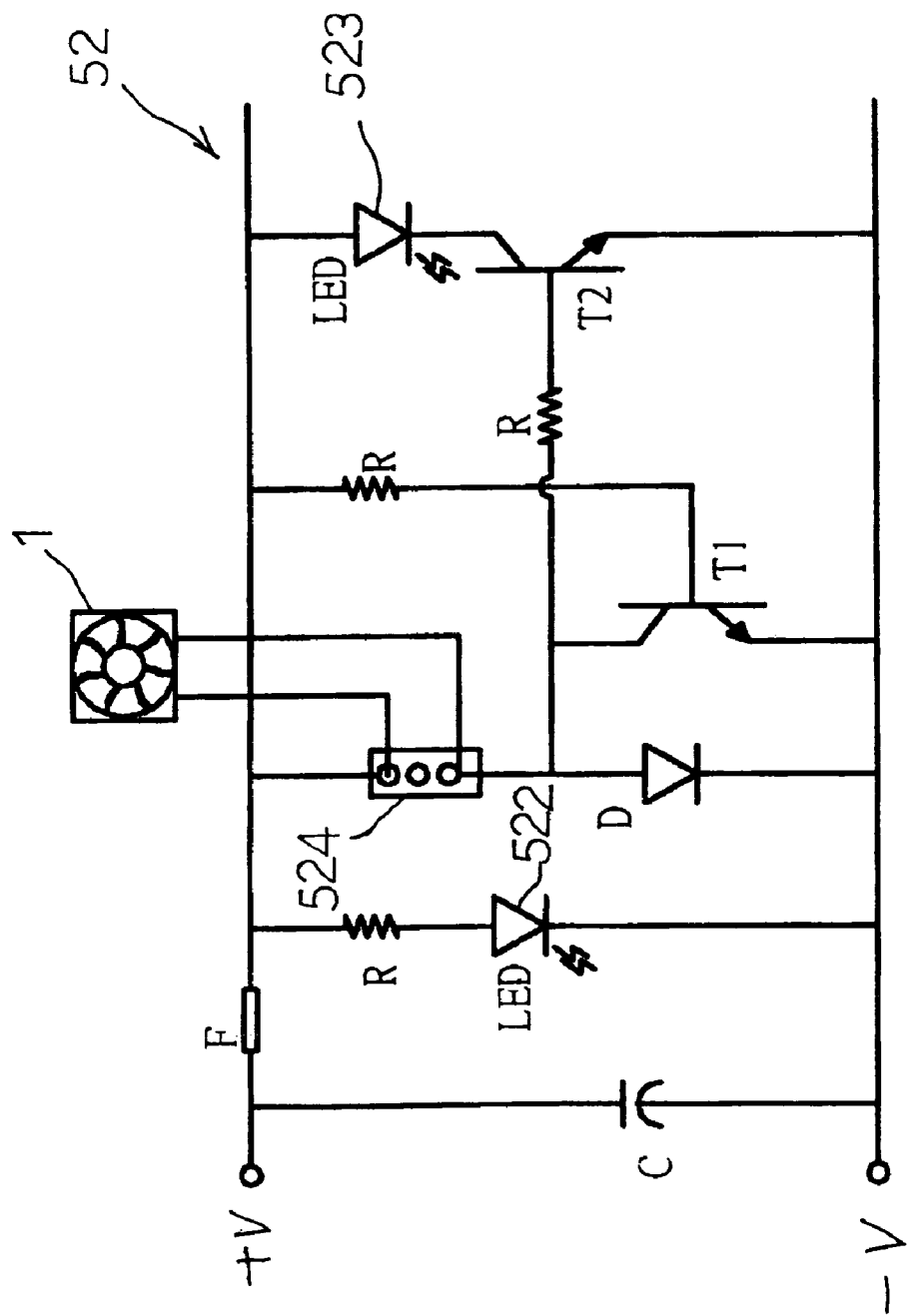
FIG. 3 is a circuit diagram illustrating arrangement of related components in the test circuit of the movable loading table.

Referring to FIG. 3, it is noted that the test heat dissipating fans 1 are not affected during testing in case of any one of the heat dissipating fans being in a state of off or short circuit.

Figure 4:
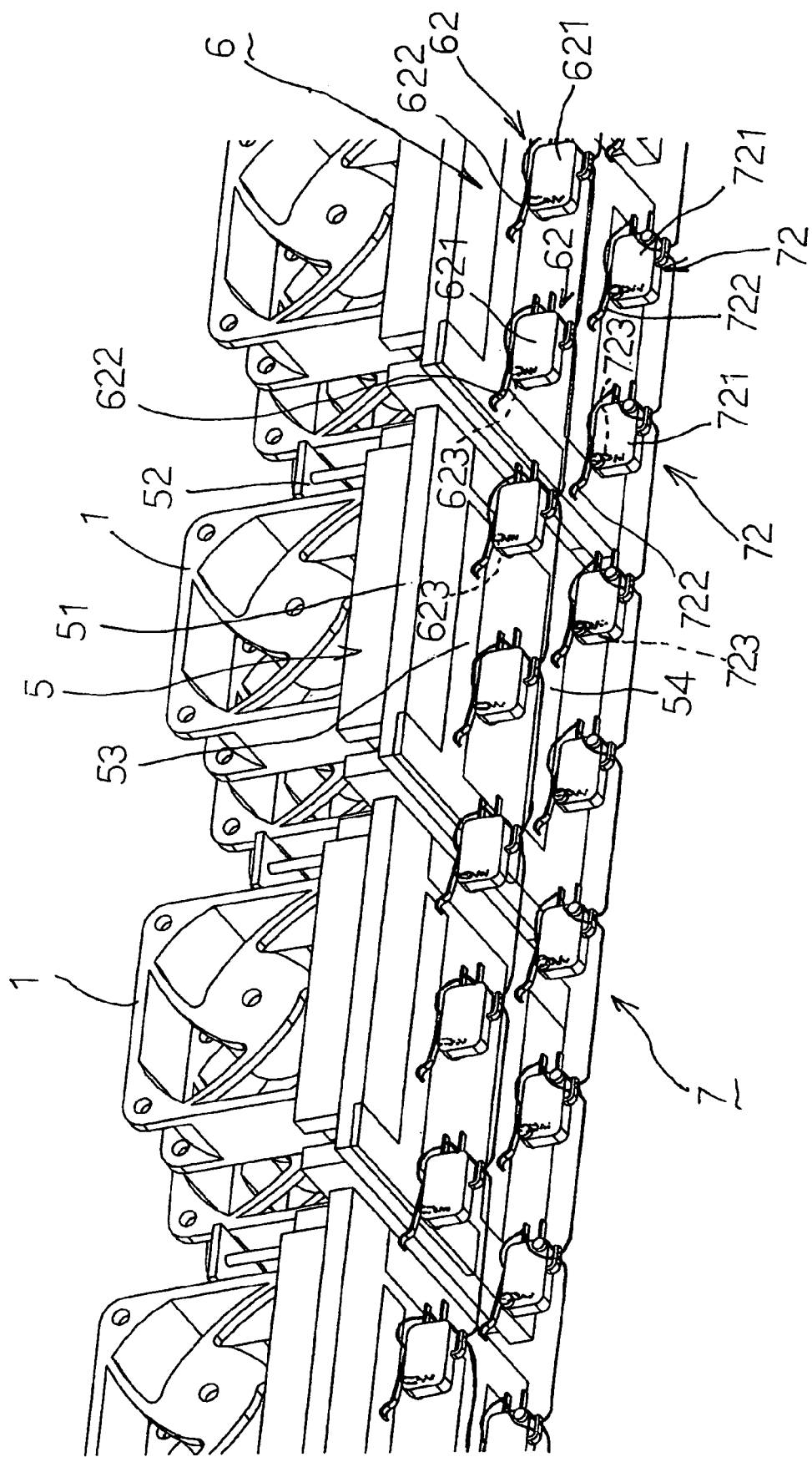
FIG. 4 is a perspective view illustrating the micro conductor rails of the first and the second conductor rail units contacting with the first and the second conductive plates.

Referring to FIG. 4 in company with FIG. 1, the first conductor rail unit 6 is disposed below each of the movable loading tables 5. The first conductor rail unit 6 in the first embodiment is disposed between the conveying belts. The conveying device is connected to direct current power and the first conductor rail unit 6 is connected to the positive pole of the power.

The first conductor rail unit 6 has an elongated locating plate 61, which is fixedly attached to the base 2, and a plurality of micro conductor rails 62, which are provided on the locating plate 61 to space from each other. The micro conductor rails 62 electrically connect with each other via electrical cords. Each of the micro conductor rails 62 further includes a main member 621, a conductive spring plate 622, which is resiliently mounted to the top of the main member 621 and is capable of the first conductive plate 53 of each of the movable loading table 5, and an urging member 623, which is capable of pushing the conductive spring plate 622. The conductive spring plate 622 keeps in a state of being pushed upward by the resilient force of the urging member 623. Hence, the conductive spring plate 622 of each micro conductor rail 62 keeps contact with the first conductive plate 53 of the corresponding movable loading table 5 to constitute a close circuit. There are at least two conductive spring plates 622, which contact with the first conductive plate 53 at any time during each movable loading table 5 moving so as to secure the movable loading table 5 being in a state of power on.

The second conductor rail unit 7 is disposed under each movable loading table 5 to space apart the first conductor rail unit 6. A plurality of micro conductor rails 62, which are provided on the locating plate 61 to space from each other. Each micro conductor rail 72 further includes a main member 721, a conductive spring plate 722, which is resiliently mounted to the top of the main member 721 and is capable of contacting the second conductive plate 54 of each of the movable loading table 5, and an urging member 723, which is capable of pushing the conductive spring plate 722.

The second conductor rail unit 7 in the first embodiment is connected to the negative pole of the power source. Similar to the first conductor rail unit 6, there are at least two conductive spring plates 722, which contact with the first conductive plate 54 at any time during each movable loading table 5 moving so as to secure the movable loading table 5 being in a state of power on. It is noted that the micro conductor unit 62 is identical with the micro conductor unit 72.

Figure 5:
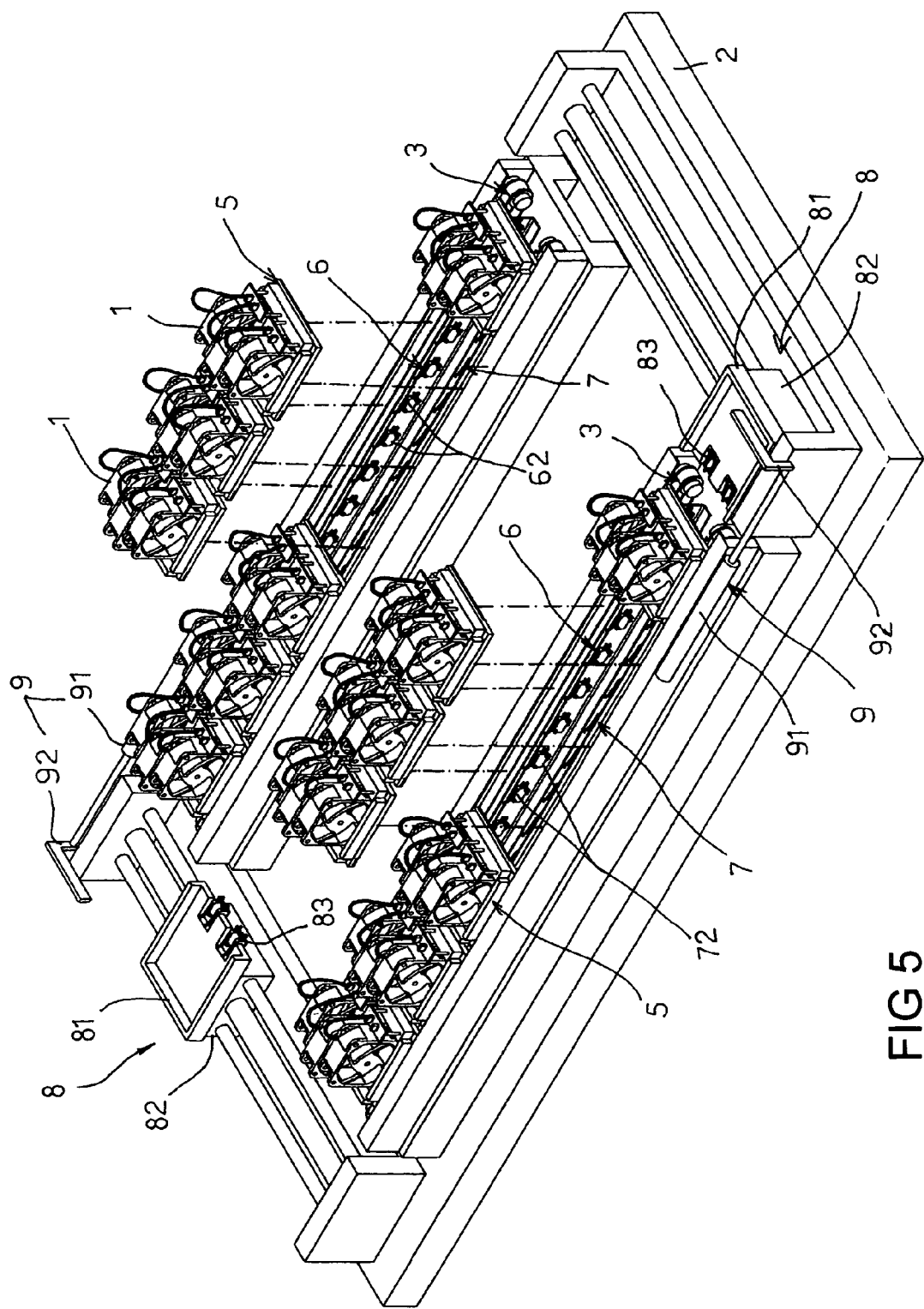
FIG. 5 is a perspective view of the second embodiment of the conveying device for testing heat dissipating fans according to the present invention.

Referring to FIGS. 5 and 6, the second embodiment of a conveying device for a heat dissipating fan according to the present invention is illustrated. The second embodiment of the conveying device includes two conveying units 3, which are mounted to the base 2 and space from each other, a plurality of movable loading tables 5, which are placed on the two conveying units 3, two first conductor rail units 6, two conductor rail units 7, which space from the first conductor rail units 6, two transfer units 8, which are mounted to the base 2, and two urging units 9, which are disposed close to the transfer units 8.

The two conveying units 3, the movable loading tables 5 and the two first and second conductor rail units 6, 7 are the same as those in the first embodiment and no detail will be described further.

The two transfer units 8 are disposed oppositely at two end sides of the conveying units 3 respectively and form a rectangular shape with the conveying units 3. The transfer units 8 receive the movable loading tables 5 from the conveying units 3 to allow the movable loading tables 5 being delivered by the conveying units 3 endlessly.

Each of the transfer units 8 has a receiving platform 81 and a transfer actuating member 82, which actuates the receiving platform 81 at least has two micro conductor rails 83 to contact the first and second conductive plates 53, 54 of the respective movable loading table 5. There are four micro conductor rails 83 in the second embodiment and each of the micro conductors 83 is the same as the preceding micro conductor rails 62, 72. The micro conductor rails 83 are disposed at the receiving platform 81 in pairs and the micro conductor pairs are arranged to space apart from each other to connect with the positive current and the negative current respectively. Hence, the movable loading tables 5 keep receiving the power for running the heat dissipating fans at the time of being carried by the receiving platform 81.

Each urging unit 9 has an urging element 91 and a moving element 92, which is actuated by the urging element 91. The moving element 92 performs a retractable extending movement over the receiving platform 81 near to it to push the movable loading table 5 on the receiving platform 81 to the conveying unit 3 near to it so that testing work on the conveying unit 3 can be carried continuously. The urging element 91 actuates the urging element 92 to move reciprocally by means of pneumatics.

As the foregoing, the conveying device for testing a heat dissipating fan according to the present invention provides a plurality of micro conductor rails 62, 72 to form the first and second conductor rails 6, 7 by way of the micro conductor rails 62, 72 being arranged to space apart from each other in company with the two conveying units 3 such that the first and second conductive plates 53, 54 at the bottom of each movable loading table 5 contact with the conductive spring plates 622, 722 sequentially during the movable loading table 5 moving for the power being able to supply the movable loading table 5 and the heat dissipating fans 1 on the movable loading tables 5 being able to be tested due to sufficient electrical energy being received continuously. In practice, the conveying device for testing heat dissipating fans according to the present invention has the following advantages:

1. It is convenient for the heat dissipating fans being performed test on the conveying device and it is easy for the conveying device being assembled. Further, test efficiency can be enhanced with the conveying device. The heat dissipating fans 1 move continuously on the two conveying units 3 and the operators only need to stay at a position to watch the fans on the conveying device being tested and assembled. Meanwhile, transmission speed and the transmission distance between the two conveying units 3 are adjustable to allow the time for each movable loading table 5 moving a round being the time for a heat dissipating fan being completed testing and assembling. In this way, no idle operators are in the whole process of the fans being tested and assembled and higher test efficiency can be reached effectively.

2. It is economical in cost and in occupying space. The first and second conductor rails 6, 7 are composed of micro conductor rails 62, 72 and each of the micro conductor rails 62, 72 is very cheap so that it is helpful for saving cost. Further, the first and second conductor rails 6, 7 provide smaller dimensions such that the entire size of the conveying device can be reduced relatively and it is favorable for being moved to a place as desired.

3. It is capable of picking out imperfect heat dissipating fans during testing to assure quality. The operation lights 523 on each test circuit 52 allow the operators to check if the heat dissipating fans are defective with sight based on signal shown on the operation lights. Hence, the defectives can be identified easily and the quality of the heat dissipating fans can be secured. Due to the test circuit 52 being designed specially as shown in FIG. 3, short circuit is not possible to occur to affect the testing work in spite of specific heat dissipating fans 1 being power failure or short circuit.

4. The endless conveying cycle allows the heat dissipating fans keep running continuously. The receiving platforms 81 of the two transfer units 8 being provided with micro conductor rails 83 allows power of the movable loading tables 5 on the receiving platforms 81 being kept supplied to prevent power failure during being transferred and especially during the urging element 91 being actuated.

While the invention has been described with referencing to preferred embodiments thereof, it is to be understood that modifications or variations may be easily made without departing from the spirit of this invention, which is defined by the appended claims.

What is claimed is:

1. A conveying device for testing heat dissipating fans, which is suitable for testing multiple heat dissipating fans at the same time, comprising:
   a base;
   a conveying unit, being mounted to the base and further comprising a conveying element and an actuating element, which actuates the conveying element to move;
   a plurality of movable loading tables, being placed on the conveying unit and delivered by the conveying element, each of the movable loading tables further comprising a support plate, a test circuit on the support plate and a first and second conductive plates, which are disposed at the bottom of the support plate and spaced apart from each other;
   a first conductor rail unit, being disposed below each of the movable loading tables, having a first locating plate, which is fixedly attached to the base, and a plurality of first micro conductor rails, which are provided on the first locating plate to space from each other, wherein, each of the first micro conductor rails electrically connects with each other and further comprises a first main member and a first conductive spring plate, which is resiliently mounted to the first main member and is capable of contacting the first conductive plate; and
   a second conductor rail unit, being disposed under each of the movable loading tables to space apart the first conductor rail unit, providing a second locating plate and a plurality of second micro conductor rails, which are provided on the elongated locating plate and space from each other, each of the second micro conductor rails further comprising a second main member and a second conductive spring plate, which is resiliently mounted to the second main member and is capable of contacting the second conductive plate;
   whereby, once the first and second conductor units are charged with positive and negative current respectively, the positive and negative current is capable of being sent to the test circuit such that each of the heat dissipating fans, which is placed on the movable loading tables respectively and electrically connects with the test circuit, is capable of being performed with operation test during moving.

2. The conveying device for testing heat dissipating fans as defined in claim 1, wherein each of the movable loading table tests at least one of the heat dissipating fans.

3. The conveying device for testing heat dissipating fans as defined in claim 2, wherein each of the movable loading table provides a test circuit and the test circuit has a power indication light and at least an operation indication light for signaling if the power is supplied and the heat dissipation fan is in operation.

4. A conveying device for testing heat dissipating fans, which is suitable for testing multiple heat dissipating fans at the same time, comprising:
   a base;
   two conveying units, being mounted to the base and spacing from each other, and further comprising a conveying element and an actuating element, which actuates the conveying element to move;
   a plurality of movable loading tables, being placed on the conveying unit and delivered by the conveying elements, each of the movable loading tables further comprising a support plate, a test circuit on the support plate and a first and second conductive plates, which are disposed at the bottom of the support plate and spaced apart from each other;
   two first conductor rail units, being disposed below each of the movable loading tables, each of the first conductor rail units having a first locating plate, which is fixedly attached to the base, and a plurality of first micro conductor rails, which are provided on the first locating plate to space from each other, wherein, each of the first micro conductor rails electrically connects with each other and further comprises a first main member and a first conductive spring plate, which is resiliently mounted to the first main member and is capable of contacting the first conductive plate; and
   two second conductor rail unit, being disposed under each of the movable loading tables to space from the first conductor rail units, each of the second conductor rail unit providing a second locating plate and a plurality of second micro conductor rails, which are provided on the elongated locating plate and space from each other, each of the second micro conductor rails further comprising a second main member and a second conductive spring plate, which is resiliently mounted to the second main member and is capable of contacting the second conductive plate;
   whereby, once the first and second conductor units are charged with positive and negative current respectively, the positive and negative current is capable of being sent to the test circuit such that each of the heat dissipating fans, which is placed on the movable loading tables respectively and electrically connects with the test circuit, is capable of being performed with operation test during moving.

5. The conveying device for testing heat dissipating fans as defined in claim 4, further comprises two transfer units mounted to the base and are disposed oppositely at two end sides of the conveying units 3 respectively to form a rectangular shape with the conveying units 3 for receiving the movable loading tables from the conveying units and continuously delivering the movable loading tables and each of the transfer units has a receiving platform and a transfer actuating member, which actuates the receiving platform to move between the conveying units.

6. The conveying device for testing heat dissipating fans as defined in claim 5, wherein each of the receiving platform provides at least two third micro conductor rails to contact the first and second conductive plates for the movable loading tables being capable of being supplied power during the receiving platforms moving.

7. The conveying device for testing heat dissipating fans as defined in claim 6, further comprises two urging units near the two transfer units and each urging unit has an urging element and a moving element, which is actuated by the urging element to move over the receiving platform corresponding to the moving element for pushing the movable loading table on the receiving platform to the conveying units.

* * * * *